US009963332B2

(12) United States Patent
Schueler (10) Patent No.: US 9,963,332 B2
(45) Date of Patent: May 8, 2018

(54) FORK CARRIAGE FOR AN INDUSTRIAL TRUCK

(71) Applicant: Jungheinrich Aktiengesellschaft, Hamburg (DE)

(72) Inventor: Michael Schueler, Schoenberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 29 days.

(21) Appl. No.: 15/010,311

(22) Filed: Jan. 29, 2016

(65) Prior Publication Data

US 2016/0221810 A1 Aug. 4, 2016

(30) Foreign Application Priority Data

Jan. 29, 2015 (DE) .................. 10 2015 101 340

(51) Int. Cl.
*B66F 9/075* (2006.01)
*B66F 9/12* (2006.01)
*B62B 3/06* (2006.01)

(52) U.S. Cl.
CPC .................. *B66F 9/12* (2013.01); *B62B 3/06* (2013.01); *B66F 9/07513* (2013.01); *B66F 9/07527* (2013.01)

(58) Field of Classification Search
CPC .................... B66F 9/07513; B66F 9/07527
See application file for complete search history.

(56) References Cited

U.S. PATENT DOCUMENTS 7,055,641 B2 * 6/2006 Lohmann ............ B66F 9/07513
180/311

FOREIGN PATENT DOCUMENTS

| DE | 29615483 | | 9/1996 | |
|----|----------|----|--------|----------|
| DE | 10057239 | A1 * | 5/2002 | .............. B66F 9/148 |
| DE | 102011015936 | | 10/2012 | |
| FR | 2832965 | A1 * | 6/2003 | .......... B66F 9/07527 |
| GB | 476991 | A * | 12/1937 | .......... B66F 9/07513 |

* cited by examiner

*Primary Examiner* — James Keenan
(74) *Attorney, Agent, or Firm* — Barclay Damon LLP

(57) ABSTRACT

A fork carriage for an industrial truck, which has a load-side main metal sheet, a fork-side main metal sheet and a driver-side main metal sheet, which are connected to a box-shaped fork carriage body with six flat sides, wherein the fork-side main metal sheet has two connecting interfaces for two fork prongs, the load-side main metal sheet has laterally two folded side plates, on each of which a kinematics interface is arranged, and the driver-side main metal sheet has a folded cover plate.

15 Claims, 10 Drawing Sheets

FORK CARRIAGE FOR AN INDUSTRIAL TRUCK

CROSS REFERENCE TO RELATED APPLICATION

This application is based upon and claims priority to German Patent Application No. 10 2015 101 340.1, filed Jan. 29, 2015, under relevant sections of 35 USC § 119, the entire contents of which are hereby incorporated by reference.

BACKGROUND OF THE INVENTION

The present invention relates to a fork carriage for an industrial truck. The fork carriage is part of the load frame of an industrial truck. The fork prongs, on which the load can be lifted and transported, are fastened to the fork carriage. The fork carriage is mounted vertically in the drive frame of the vehicle by means of a linear guide, for example with a lift mast profile in the drive frame and rollers on the fork carriage. The height position of the fork carriage is determined by one or more lift cylinders and a load is lifted or lowered. The fork carriage is an important structural frame part for the load part of the industrial truck, which is designed according to the load capacity and the operating conditions of the industrial truck.

Known fork carriages have additionally installed belts or struts, with which the fork carriage is given the necessary rigidity and stability. The use of additional belts or struts in the fork carriage represents high material use, which leads to high material costs and a heavy weight for the vehicle. Moreover, the assembly of the fork carriage is also complex and time-intensive due to an additional belt or strut structure.

The object of the invention is to provide a fork carriage for an industrial truck, which uses less material and is easy to assemble with the same stability and rigidity.

The object according to the invention is solved by a fork carriage with the characteristics of claim 1. Advantageous embodiments are the subject matter of the dependent claims.

BRIEF SUMMARY OF THE INVENTION

The fork carriage according to the invention is provided and specified for an industrial truck with liftable load forks. The fork carriage according to the invention has a load-side main metal sheet, a fork-side main metal sheet and a driver-side main metal sheet. The main metal sheets are connected to form a box-shaped fork-carriage body with six flat sides. The design of the fork carriage body according to the invention results from the shape of the main metal sheets. The fork-side main metal sheet has two connecting interfaces for two fork prongs. The load-side main metal sheet has laterally two folded side plates, on each of which a kinematics interface is arranged. The kinematics interfaces are provided so that the fork carriage can move relative to a mast profile. The driver-side main metal sheet provided according to the invention has a folded cover plate. The interconnected main metal sheets have a box-shaped body, on which the fork-side and the load-side main metal sheet form five sides of the fork carriage body and the sixth side is formed mainly by the fork-side main metal sheet. An important aspect of the box-shaped fork carriage is that it gets its rigidity and stability from the shape and connection of the main metal sheets and additional reinforcing and connecting devices can be foregone.

In a preferred design, the main metal sheets forming a box-shaped hollow body are designed such that the fork carriage gets it rigidity and stability from them. The formation of the main metal sheets in this context refers for example to their wall thickness, their shape and connection with each other. The box-shaped hollow body, which is sufficiently stable and forms the fork carriage, arises through the connection of the main plates with each other.

In a further preferred design, each kinematics interface has a pair of roller bolts, each of which can mount a roller guided in a mast profile. Other kinematics interfaces, like for example in the shape of levers, sliding bodies or the like, are also generally possible. The kinematics interface can also provide a profile rail, which is guided on lift-mast-side rollers, on the fork carriage.

In a preferred design of the fork carriage according to the invention, the driver-side main metal sheet has a through hole to a lift cylinder space arranged in the fork carriage. The lift cylinder space is provided in order to receive the lift cylinder for lifting and lowering the fork carriage in an installed state of the fork carriage.

In a further preferred design, the driver-side main metal sheet is equipped with a lift cylinder plate, which is folded in the direction of the cover plate.

The lift cylinder plate is folded away from the driver-side main metal sheet and forms a side wall of the lift cylinder space, which is formed inside the fork carriage.

In a further preferred design, a lift cylinder plate is provided, which is folded in the direction of the cover plate. The lift cylinder plate forms a side wall of the lift cylinder space.

A further lift cylinder metal sheet is preferably provided, which has an L shape and delimits the lift cylinder space together with the lift cylinder plate. The lift cylinder metal sheet and the lift cylinder plate delimit the lift cylinder space on three sides, wherein the lift cylinder metal sheet also serves as a stop surface for a piston rod of the lift cylinder.

In a further preferred design, the load-side main metal sheet has a folded floor plate, which is folded in the direction of the side plates. The folded floor plate works with the fork-side main metal sheet to achieve sufficient support for the fork prongs. For a better connection with the driver-side main metal sheet, the floor plate has at least one projection on its free end. The at least one projection is connected with the driver-side main metal sheet in order to create a stiffer connection for the connecting interfaces of the fork-side main metal sheet. The at least one projection also facilitates production in that the main metal sheets can be assembled easier in a defined position.

In a preferred design, the fork-side main metal sheet is designed with a U-shaped contour, wherein one arm is connected with the load-side main metal sheet and the other arm with the driver-side main metal sheet. The floor plate of the load-side main metal sheet is thereby preferably connected with the arm of the fork-side main metal sheet, which is connected with the driver-side main metal sheet. The floor plate of the load-side main metal sheet together with the fork-side main metal sheet forms a closed shape, which is sufficiently stable for receiving and mounting the fork prongs.

The load-side main metal sheet has a ledge extending between the side plates on its load-side flat side. The ledge serves to contour the load-side main metal sheet and can work together with the lift cylinder plate and the lift cylinder metal sheet.

The fork carriage according to the invention dispenses with reinforcing struts and belts, whereby the weight, number of installed parts and production costs are reduced.

BRIEF DESCRIPTION OF THE DRAWINGS

A preferred design of the fork carriage for an industrial truck is described below. The figures show in.

DETAILED DESCRIPTION OF THE INVENTION

Figure 1:
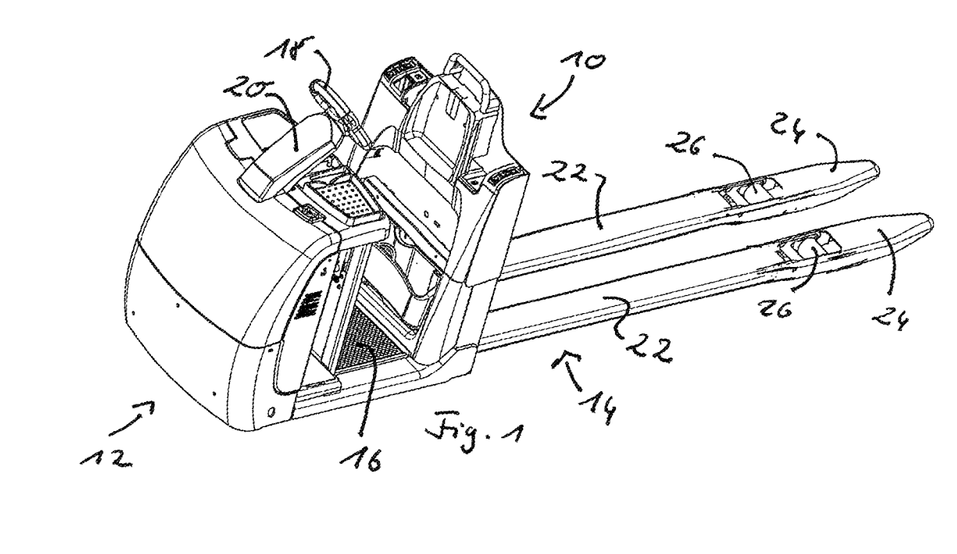
FIG. 1 depicts a forklift with a standing platform.

FIG. 1 shows a forklift 10 with a drive part 12 and a load part 14. The drive part 12 has a standing platform 16, from which a steering wheel 18 with control elements is accessible via a short drawbar 20. The load part 14 has two fork prongs 22, which have load rollers 26 in the area of their tip 24.

Figure 2:
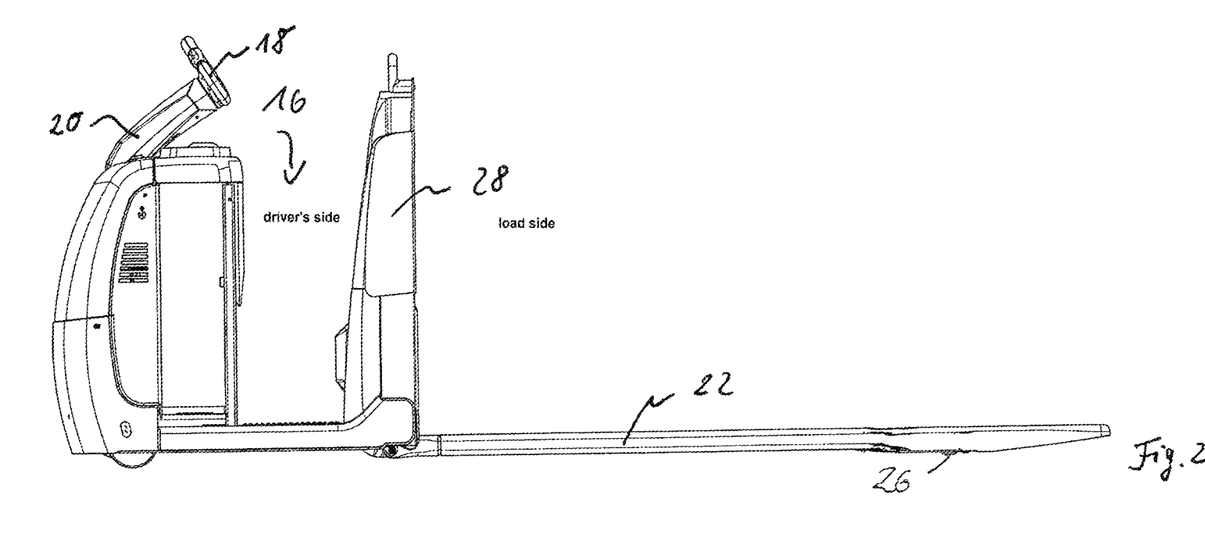
FIG. 2 is a side view of the forklift.

FIG. 2 shows the forklift 10 from FIG. 1 in a view from the side. The height of the fork prongs 22 is adjustable along the rear wall 28 of the standing platform 16.

Figure 3:
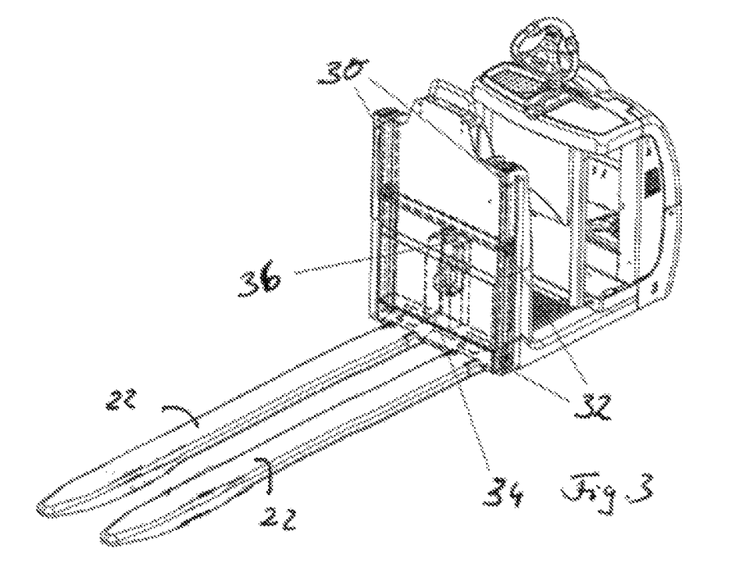
FIG. 3 depicts the forklift from FIG. 1 with a fork carriage shown transparently.

FIG. 3 shows a more detailed structure for the height adjustment. According to this, two lift rails 30, in each of which a pair of mast roller bolts 32 run, are provided in the rear wall 28. The mast roller bolts are arranged laterally on a fork carriage 34, to which the fork prongs 22 are also fastened. The fork carriage 34 is raised via a lift cylinder 36. The lift cylinder 36 is supported on the frame of the drive part and lifts or respectively lowers the fork carriage along the lift rails 30.

Figure 4:
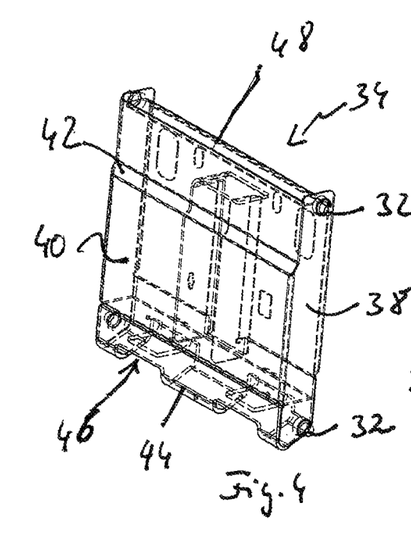
FIG. 4 depicts the fork carriage from FIG. 4 from the load side transparently.
Figure 5:
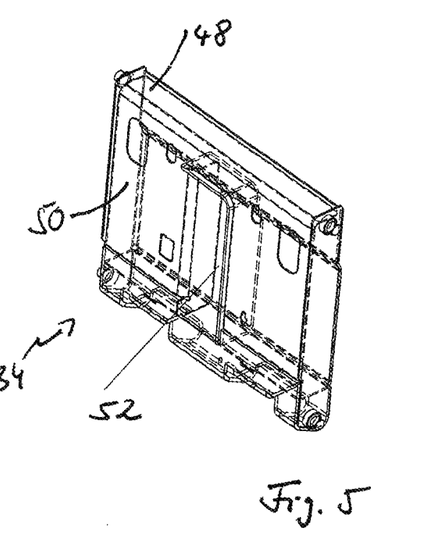
FIG. 5 depicts the fork carriage from FIG. 4 from the driver side transparently.

FIGS. 4 and 5 shows a box-shaped fork carriage 34 in a transparent view, once from the driver side in FIG. 5 and once from the load side in FIG. 4. The side plates 38 with the lift mast roller bolts 32 can be seen in FIG. 4. The lift mast roller bolts 32 are arranged on opposite-lying ends of the side plates 38. The slide plates are folded away from the load-side main metal sheet 40, which can be seen as the front main metal sheet in FIG. 4. The load-side main metal sheet 40 has a ledge 42, which extends between the side plates 38.

Figure 6:
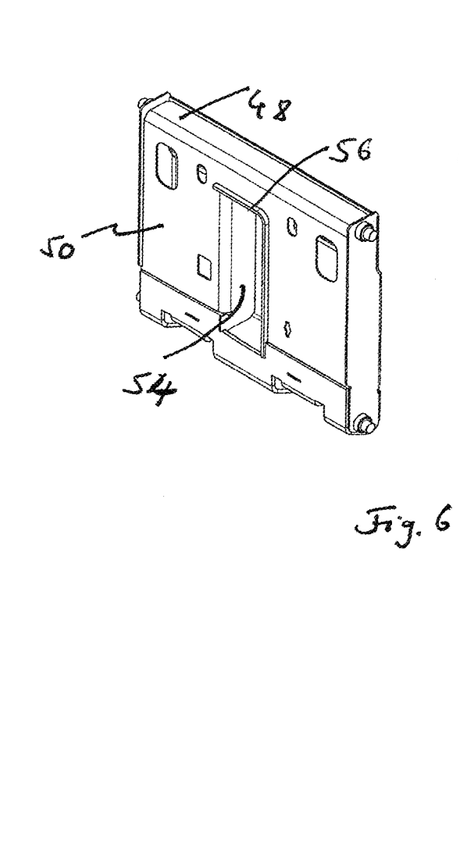
FIG. 6 depicts the fork carriage from the driver side.

The fork-side main metal sheet 44 is arranged on the lower end of the fork carriage 34. In FIGS. 4 and 5, the connecting interfaces 46 for the fork connections can be seen with the respective recesses. In FIGS. 4 and 5, the cover plate 48 is also shown, which is folded away from a driver-side main metal sheet 50. The structure of the lift cylinder space 52 is shown in FIG. 6. FIG. 6 is a view from FIG. 5 with the driver-side main metal sheet 50, which has a lift cylinder plate 54. The lift cylinder plate 54 and the cover plate 48 are in this connection folded in the same direction on the driver-side main metal sheet 50. FIG. 6 also shows the L-shaped lift cylinder metal sheet 56, which delimits, together with the lift cylinder plate 54, the lift cylinder space from three sides.

Figure 7:
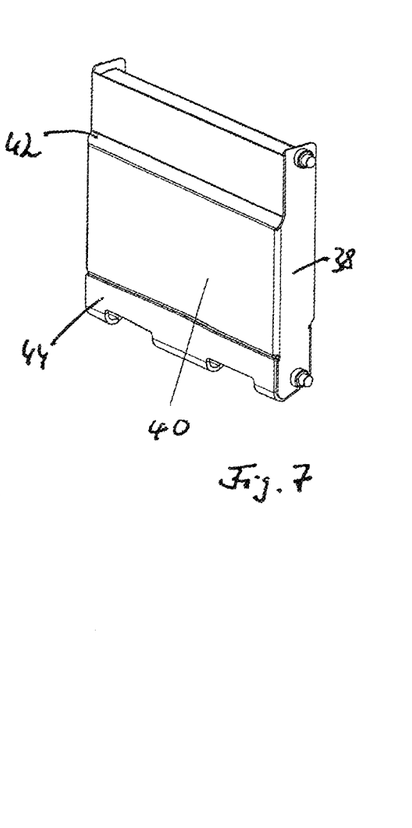
FIG. 7 depicts the fork carriage from the load side.

FIG. 7 shows the fork carriage 34 in a load-side view with its load-side main metal sheet 40, which has a ledge 42. The fork-side main metal sheet 44 can also be seen. The view from FIG. 7 corresponds to the transparent representation from FIG. 4. FIG. 7 also shows that the side plate 38 ends with the fork-side main metal sheet 44.

Figure 8:
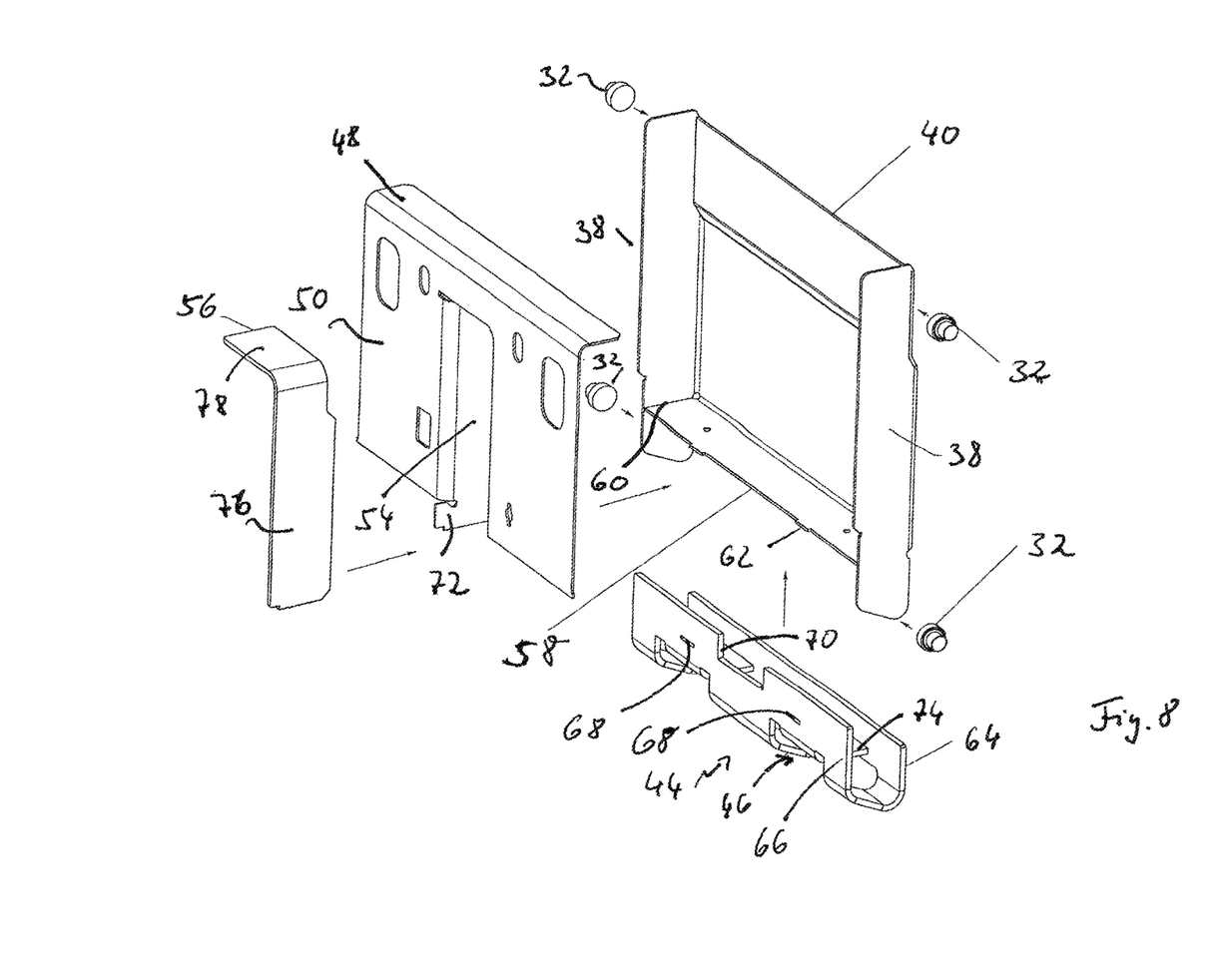
FIG. 8 is an exploded view of the fork carriage.

FIG. 8 shows the fork carriage 34 according to the invention in an exploded view. The load-side main metal sheet 40 with its side plates 38 is shown. Furthermore, a floor plate 58 extending in the longitudinal direction of the vehicle is provided. The floor plate 58 is folded in the same direction as the side plates 38 and is connected, for example welded, with the side plates 38 along the connecting seam 60. The lift mast roller bolts 32 or their bolts are attached to the side plates 38. The lift mast roller bolts 32 are one possible design for a kinematics interface, with which the fork carriage is mounted in a height-adjustable manner.

The floor plate 58 has two projections 62 on its free end.

FIG. 8 also shows the fork-side main metal sheet 44 with its arms 64 and 66. The arm 64 is designed as a load-side arm, while the arm 66 forms the driver-side arm. Overall, the fork-side main metal sheet 44 has an approximately U-shaped structure, where FIG. 8 already shows that the driver-side arm 66 is designed higher than the load-side arm 64.

FIG. 8 shows two slits 68 in the driver-side arm 66, which are designed for the projections 62 in the installed state. A recess 70, into which a lower section 72 of the lift cylinder plate 54 protrudes, is also provided centered on the driver-side arm 66.

It can also be seen in FIG. 8 that an inward protruding connecting plate 74 is arranged in the connecting interfaces 46. The inward protruding connecting plate 74 forms the connecting interfaces 46 by creating a recesses in the fork-side main metal sheet 44.

FIG. 8 also shows the driver-side main metal sheet 50 with its cover plate 48. The lift cylinder plate 54 protrudes in the area of a through hole. The lift cylinder plate 54 is completed by the lift cylinder metal sheet 56, which has a side section 76 and a head section 78. The side section 76 together with the lift cylinder plate 54 forms the lateral boundaries for the lift cylinder space 52. The head section 78 of the lift cylinder plate 56 serves as a stop for the lift cylinder in order to lift and lower the fork carriage.

Figure 9:
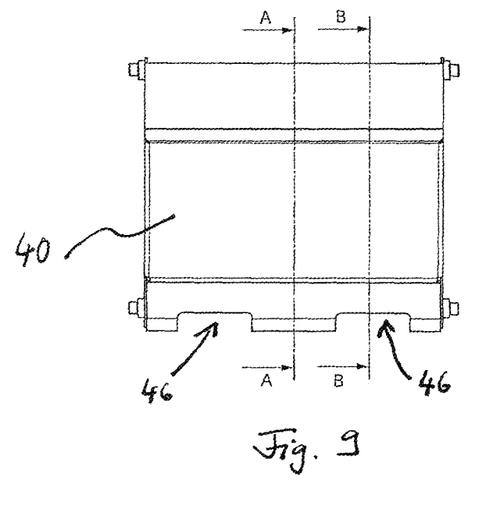
FIG. 9 depicts the fork carriage from the load side.
Figure 10:
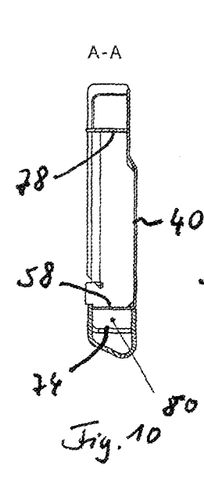
FIG. 10 is a sectional view of the fork carriage along the line A-A from FIG. 6.

FIG. 9 shows the assembled fork carriage in a view of the load-side main metal sheet 40. FIG. 10 shows the cut along the line A-A through the fork carriage. The cut A-A is centered so that the cut is made through the lift cylinder space 52 in the middle between the connecting interfaces 46. The head section 78 of the lift cylinder metal sheet 56 can be seen in FIG. 10. The floor plate 58 of the load-side main metal sheet 40 can be seen opposite the head section 78. The connecting plate 74, which lies deeper than the floor plate 58, so that a hollow space 80 forms here in the fork carriage, is also shown in FIG. 10.

Figure 11:
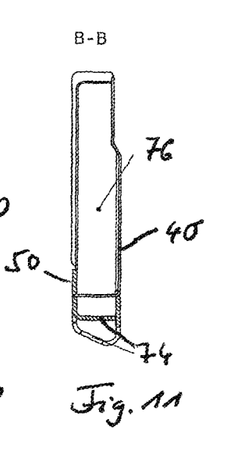
FIG. 11 is a sectional view of the fork carriage along the line B-B from FIG. 9.

As shown in FIG. 11, the connecting plate 74 is connected on its free end with the load-side main metal sheet 40. On its opposite-lying end, the connecting plate 74 is folded away from the driver-side main metal sheet.

The area visible above the floor plate 58 is the side section 76 of the lift cylinder metal sheet 56 seen from outside the lift cylinder space or alternatively the lift cylinder plate 54 from outside of the lift cylinder space.

The sectional representations from FIGS. 10 and 11 clearly show that the entire fork carriage receives a sufficiently rigid and loadable shape through the connection between the load-side and driver-side main metal sheet.

Figure 12:
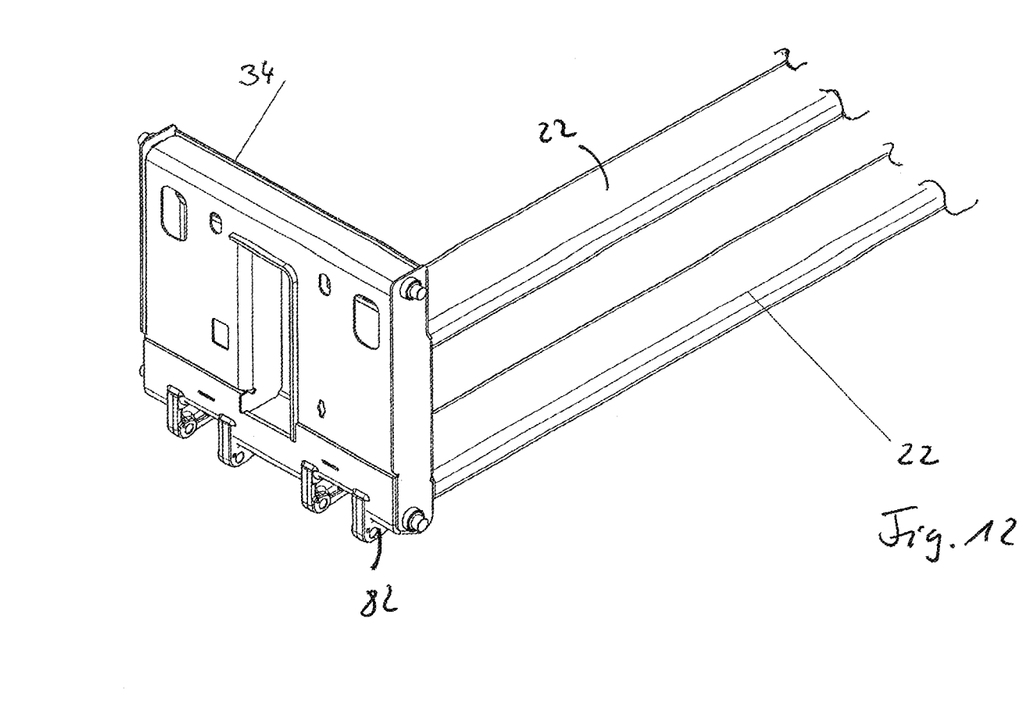
FIG. 12 depicts the fork carriage with added fork prongs.
Figure 13:
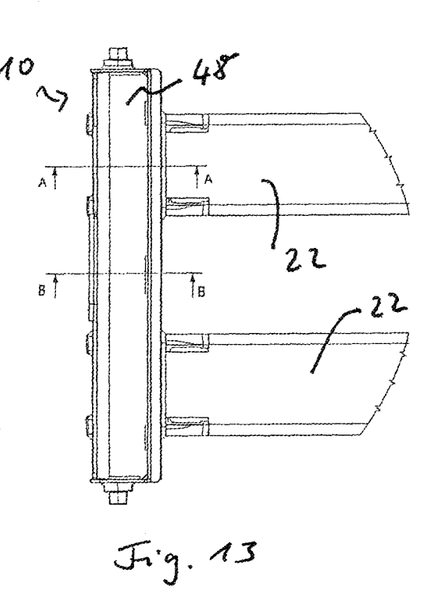
FIG. 13 is a top view of the fork carriage with fork prongs.

FIG. 12 shows the fork carriage 34 together with the fork prongs 22, which are connected with the connecting interfaces 46 with their connection adapter 82. FIG. 13 shows a top view of the fork carriage 34 with its cover plate 48 and added fork prongs 22.

Figure 14:
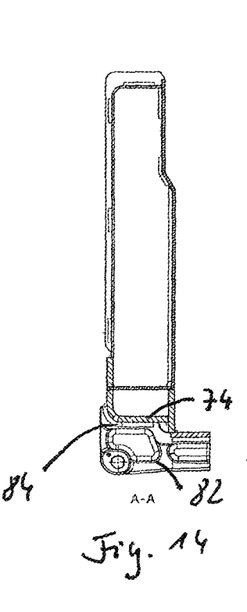
FIG. 14 is a sectional view of the fork carriage along line A-A from FIG. 13.
Figure 15:
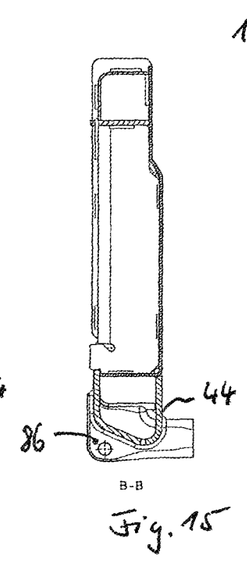
FIG. 15 is a sectional view of the fork carriage along line B-B from FIG. 13.

FIG. 14 shows the cut along the line A-A from FIG. 13 in the middle through the fork prong 22. It can be clearly seen that the connecting plate 74 of the fork-side main metal sheet 44 is based on an adjusted stop surface 84 of the connection adapter 82. It can be seen in FIG. 15 how the contour of the fork-side main metal sheet 44 is connected with a connection adapter.

Figure 16:
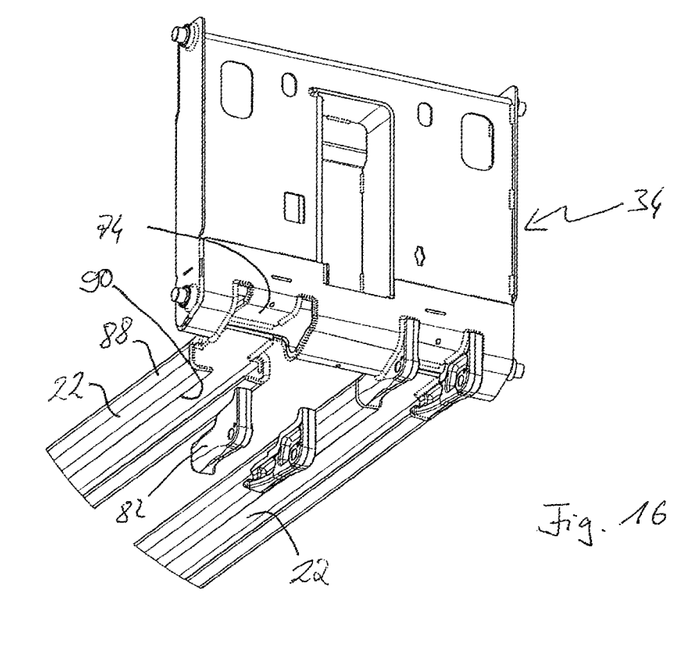
FIG. 16 depicts the fork carriage with the fork prong connections.

FIG. 16 shows in a partially exploded representation the connection of the fork prongs 22 to the fork carriage 34. Each of the fork prongs 22 consists of an prong body 88, which has a U-shaped profile at least in the area of the fork carriage, in which the arm edges 90 are bent towards each other. The connection of the prong body 88 takes place via the connection adapter 82, which is designed in an almost L-shaped manner. The connection adapter is welded with the edges of the connecting interfaces 46 in the fork-side main metal sheet. Moreover, the connection adapter is welded with the prong body 88. The connection gets additional stability via the welding with the connecting plate 74, which is also welded with the opposite-lying arms of the fork-side main metal sheet on its free end. A stable connection of the fork prongs with the fork carriage 34 can be achieved via two connection adapters 82.

Figure 17:
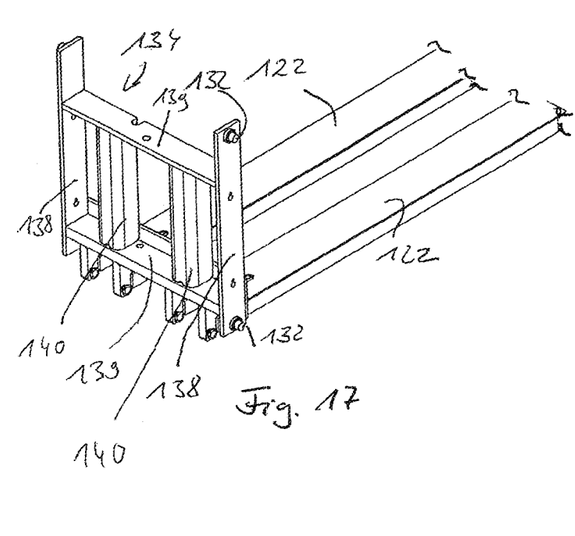
FIG. 17 depicts a fork carriage with fork prongs in a design according to prior art.
Figure 18:
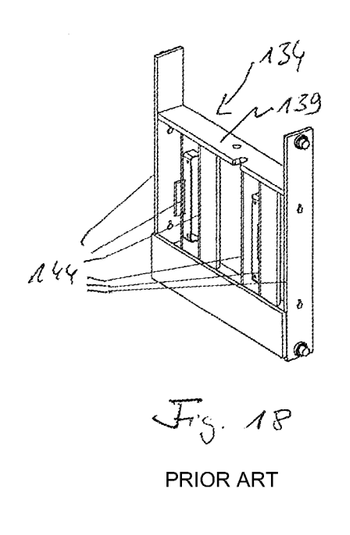
FIG. 18 depicts the fork carriage from FIG. 17 in a load-side view.
Figure 19:
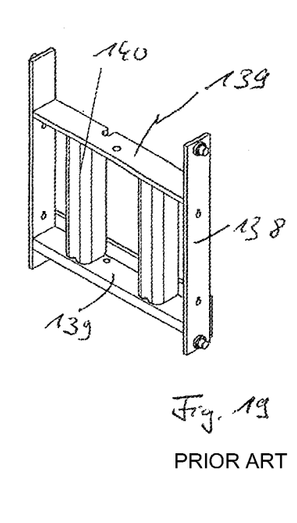
FIG. 19 depicts the fork carriage from FIG. 17 in a driver-side view.

The FIGS. 17 to 19 show a conventional fork carriage 134 with fork prongs 122 according to prior art. The known fork carriage 134 has two side walls 138 each with two lift mast roller bolts 132 on their ends. The side walls 138 are connected with each other via two horizontal cross-members 139. Two U-shaped profiles 140, which are designed as belts or vertical struts and give the fork carriage 134 the required rigidity and stability, are set between the cross-members 139. The fork carriage 134 is covered on the driver side and load side without the covering having a supporting function.

FIG. 18 shows the fork carriage 134 from the load-side view with the installed U-shaped profiles 140. A total of six vertically progressing belts 144 develop, which stabilize amongst each other the fork carriage 134 via its cross-members 139. Of the six belts, four belts are formed by the U-shaped profiles 140 and two belts by the side walls 138.

FIG. 19 shows the fork carriage 134 in a driver-side view, wherein the U-shaped profiles 140 are closed on the driver side.

With the fork carriage according to the invention, the four force transmission points of the lift roller bolts are connected with each other in a stiff and force-flow-suitable manner with minimal material use through the use of a box-shaped hollow body.

The rigidity is not achieved through e.g. individual vertical bars or struts but rather through the structure of the closed box, wherein the same effect is achieved simultaneously with greater simplicity and fewer parts and less material use. The closed box enables a reciprocal supporting effect of the individual main metal sheets, whereby use of thin-walled metal sheet structures is also possible.

The invention claimed is:

1. A fork carriage for an industrial truck, the fork carriage comprising:
    a fork-side main metal sheet comprising two connecting interfaces, wherein each of the connecting interfaces is configured to receive a fork prong;
    a load-side main metal sheet comprising two laterally folded side plates;
    a kinematics interface mounted on the laterally folded side plates; and
    a driver-side main metal sheet comprising a folded cover plate and a through hole to a lift cylinder space,
    wherein the driver-side main metal sheet, the load-side main metal sheet, and the fork-side main metal sheet are connected to form a box shaped hollow body,
    wherein the driver-side main metal sheet further comprises a lift cylinder plate, which is folded in a same direction as the folded cover plate.

2. The fork carriage of claim 1, wherein the kinematics interface is a plurality of rollers.

3. The fork carriage of claim 1, further comprising a lift cylinder metal sheet, wherein the lift cylinder metal sheet comprises an L shape and delimits the lift cylinder space together with the lift cylinder plate.

4. The fork carriage of claim 1, wherein the load-side main metal sheet comprises an angled floor plate, which is folded in the same direction of the laterally folded side plates.

5. The fork carriage of claim 4, wherein the angled floor plate comprises at least one projection on its free end.

6. The fork carriage of claim 1, wherein the load-side main metal sheet comprises a ledge extending between the side plates.

7. The fork carriage of claim 1, wherein each of the connecting interfaces is a recess formed by the inward folding of a connecting plate.

8. A fork carriage for an industrial truck, the fork carriage comprising:
    a fork-side main metal sheet having a U-shaped contour and further comprising,
        a load-side arm and a driver-side arm, and
        two connecting interfaces, wherein each of the connecting interfaces is configured to receive a fork prong;
    a load-side main metal sheet comprising two laterally folded side plates;
    a kinematics interface mounted on the laterally folded side plates: and
    a driver-side main metal sheet comprising a folded cover plate, wherein the driver-side main metal sheet, the load-side main metal sheet, and the fork-side main metal sheet are connected to form a box shaped hollow body, and wherein the load-side arm is connected to the load-side main metal sheet and the driver-side arm is connected to the driver-side main metal sheet.

9. The fork carriage of claim 8, wherein the load-side main metal sheet further comprises a floor plate that, is connected to the load-side arm of the fork-side main metal sheet.

10. The fork carriage of claim 8, wherein the load-side main metal sheet has a ledge extending between the laterally folded side plates on a load-side of the fork carriage.

11. The fork carriage of claim 8, wherein each of the connecting interfaces is a recess formed by an inward folding of a connecting plate.

12. The fork carriage of claim 8, wherein the kinematics interface is a plurality of rollers.

13. The fork carriage of claim 8, further comprising a lift cylinder metal sheet, wherein the lift cylinder metal sheet comprises an L shape and defines a lift cylinder plate and a lift cylinder space.

14. The fork carriage of claim 8, wherein the load-side main metal sheet comprises an angled floor plate that is folded in a same direction of the laterally folded side plates.

15. The fork carriage of claim 14, wherein the angled floor plate comprises at least one projection.

\* \* \* \* \*

UNITED STATES PATENT AND TRADEMARK OFFICE
CERTIFICATE OF CORRECTION

PATENT NO. : 9,963,332 B2  
APPLICATION NO. : 15/010311  
DATED : May 8, 2018  
INVENTOR(S) : Michael Schueler Page 1 of 1

It is certified that error appears in the above-identified patent and that said Letters Patent is hereby corrected as shown below:

In the Claims

Column 7, Line 2, remove the "," after "a floor plate that,..."

Signed and Sealed this
Fourth Day of June, 2019

Andrei Iancu
*Director of the United States Patent and Trademark Office*